(12) United States Patent
Mancini et al.

(10) Patent No.: US 6,583,982 B2
(45) Date of Patent: Jun. 24, 2003

(54) INTRINSICALLY SAFE ENCLOSURE AND METHOD

(75) Inventors: Phillip D. Mancini, Fairfax, VA (US); Steven A. Newman, McLean, VA (US)

(73) Assignee: Xybernaut Corporation, Fairfax, VA (US)

( * ) Notice: Subject to any disclaimer, the term of this patent is extended or adjusted under 35 U.S.C. 154(b) by 79 days.

(21) Appl. No.: 09/884,242

(22) Filed: Jun. 19, 2001

(65) Prior Publication Data

US 2002/0191372 A1 Dec. 19, 2002

(51) Int. Cl.[7] .................................................. G06F 1/16
(52) U.S. Cl. ........................ 361/683; 361/679; 361/686
(58) Field of Search ................................. 361/679, 683, 361/686

(56) References Cited

U.S. PATENT DOCUMENTS

| | | | |
|---|---|---|---|
| 5,305,244 A | 4/1994 | Newman et al. | |
| 5,844,824 A | 12/1998 | Newman et al. | |
| 5,999,952 A | 12/1999 | Jenkins et al. | |
| 6,029,183 A | * 2/2000 | Jenkins et al. | 708/100 |
| 6,304,459 B1 | * 10/2001 | Toyosato | 361/681 |
| 6,359,777 B1 | * 3/2002 | Newman et al. | 361/683 |
| 6,421,232 B2 | * 7/2002 | Sallam | 361/681 |

\* cited by examiner

*Primary Examiner*—Darren Schuberg
*Assistant Examiner*—Yean-Hsi Chang
(74) *Attorney, Agent, or Firm*—James J. Ralabate Esq.; Christopher Tucker, Reg, Patent Agent

(57) ABSTRACT

The invention is a wearable computer system comprised of a transferable core computer module and an enclosure which has been constructed to be instrinsically safe according to Class 1, Divisions 1, 2 or both of the U.S. Electrical Code. According to the system of the present invention, workers may make use of this system in environments in which typical electrical devices may not be used due to the presence of ambient ignitable gases and vapors. The enclosure may also be designed to have the properties of water tightness, air tightness and shock absorbtion.

17 Claims, 5 Drawing Sheets

INTRINSICALLY SAFE ENCLOSURE AND METHOD

INVENTION

The invention is directed to the field of computers and computer enclosures which are intrinsically safe, waterproof, or otherwise ruggedized. Specifically, the invention is designed to enclose a transferable core computer.

BACKGROUND OF THE INVENTION

The pervasiveness and efficiency of modem computers has expanded their role from a desktop tool for document processing and application serving to a productivity enhancing tool for technical field workers to perform their job functions in a more efficient and comfortable manner. Their has been repeated affirmation in the marketplace of the gains in efficiency to be had from making computers mobile so that field workers can have the same access to information and computing power that traditional office workers have.

The first step towards mobile computing was the laptop or notebook computer which for the first time enabled workers to take their computer with them. Resultingly, repair men, field technicians, inspectors and even businessmen on travel adopted laptop technology and were able to transport their information and access it at locations remote to their offices. The laptop, however, suffers from the limitation that it is not convenient to carry around and use at the same time. It must be set up on a flat surface for effective use and it is relatively heavy when carried in the hand. It is nearly impossible to use a laptop without setting it on a surface.

The next milestone in mobile pervasive computing was the wearable computer. Computers, such as those described in commonly assigned U.S. Pat. Nos. 5,305,244 and 5,844,824 and successfully commercialized under the trade name MOBILE ASSISSTANT, disclose a user supported voice activated computer which can be worn on the body of user and comfortably utilized by a technician while maintaining his hands free to perform other tasks. This is facilitated through a body worn display and a plurality of activation means all of which are hands free. Throughout the disclosure and claims of this application the term wearable computer will be taken to a mean a computer such as that disclosed in these two aforementioned patents.

Also known in the art are transferable core computers such as the computers described in commonly assigned U.S. Pat. Nos. 5,999,952 and 6,029,183. The disclosure of these two patents is hereby incorporated by reference and for the purposes of this disclosure and claims the term "transferable core computer", "core", "core computer module" or "core module" will be taken to mean a computer system such as is disclosed in these patents. These patents teach a core computer module which contains some of the essential components of a computer such as CPU, hard disk, and memory, but is absent any usable interface. This module can be inserted into a variety of enclosures such as a desktop computer, laptop computer, communication device etc. The key feature of the transferable core architecture is that the actual computing power comes from the core module, but the interface comes from the enclosure, while neither the module or the enclosure will function as a computer without the other. This design will permit a variety of enclosures to be designed to meet specific environmental and physical application needs, without needing to make any modification to the core module itself. Furthermore, a user will always have his data with him if he is working out in the field using a wearable computer he can simply remove the core module when he is finished and insert it into a desktop computer to upload, update and/or synchronize any data gathered in the field.

While these mobile computer systems have significantly enhanced productivity of mobile technical workers in fields such as manufacturing, inspection, data acquisition, remote sensing, and navigation, there are certain environments to which technicians are exposed which will not permit the use of ordinary computing equipment due to the ambient conditions. These conditions include humidity, excessive heat, moisture, vibration, ambient flammable gases, gas vapors and liquids. Of particular concern are environments in which flammable or volatile materials are present. Devices which can operate in these environments are known as Intrinsically Safe. According to the National Electric Code, 1990, Article 500, Class 1 environments, Flammable Gasses or Vapors, are locations in which flammable gases or vapors are or may be present in the air in quantities sufficient to produce explosive or ignitable mixtures. Class 1 is segmented into two divisions. A Class 1, Division 1 location is one in which ignitable concentrations of flammable gases or vapors may be present because: (1) they exist under normal operating conditions, (2) they exist frequently because of repair, maintenance operations, or leakage, (3) breakdown or faulty operation of equipment or process which causes simultaneous electrical equipment failure. A Class 1, Division 2 location is one in which ignitable concentrations of flammable liquids or gases may be present as a result of: (1) an accidental rupture or breakdown of the normally closed containers, systems, or equipment, (2) a failure or abnormal operation of the venting equipment, (3) being located adjacent to a Class 1, Division 1 location from which ignitable concentrations of gases or vapors might occasionally be communicated. Within Divisions 1 and 2 there are four groupings of ambient atmospheres segmented by the type of materials present: Group A is atmospheres containing acetylene, Group B is atmospheres containing hydrogen, fuel and combustible process gases containing more then 30 percent hydrogen by volume, or gases or vapors of equivalent hazard such as butadiene, ethylene oxide, propylene oxide, and acrolein, Group C is atmospheres such as cyclopropane, ethyl ether, ethylene, or gases or vapors of equivalent hazard, and Group D is atmospheres such as acetone, ammonia, benzene, butane, ethanol, gasoline, hexane, methanol, methane, natural gas, naptha, propane or gases or vapors of equivalent hazard. These environments are typical to the chemical, power, and petrochemical industries. Workers in these environments are prevented from making use of computer equipment that has not been rendered IS DIV 1 or DIV 2 due to the risk of explosion from spark generation.

Typically, to effect intrinsic safety, devices are built from the component level up to be electrically insulated against sparking. This requires specialized components, limited production runs, re-engineering of existing products and significantly increases the cost of devices. As a result, very few electronic items are built because manufactures and customers can not take advantage of the economies of scale derived from commercial-off-the-shelf (hereinafter COTS) products to meet there IS needs.

Thus, there exists a need for a computer device which has been certified to be intrinsically safe but which requires little or no modification of an existing COTS computer products or platforms.

SUMMARY OF THE INVENTION

It is therefore an object of this invention to provide a novel computer system which is intrinsically safe or otherwise ruggedized but which is devoid of the aforementioned limitations.

It is another object of this invention to provide a computer system which is intrinsically safe according to Article 500 of the National Electrical Code, Class 1, Divisions 1 and 2.

It is still another object of this invention to provide a computer system which achieves intrinsic safety and ruggedness without modification of a general purpose computer device.

It is yet another object of this invention to provide a ruggedized and intrinsically safe computer system which is based on transferable core technology.

It is an additional object of this invention to provide a ruggedized and intrinsically safe computer system which is comprised of an intrinsically safe sealed enclosure and a transferable core computer.

These and additional objects of the present invention are accomplished generally by a ruggedized and intrinsically safe computer system.

In a preferred embodiment of the present invention, a person using the computer will take the core computer and insert it into the enclosure of the present invention rendering the computer system created by the combination of the two components intrinsically safe (IS), according to class 1, division 1, division 2 or both of the U.S. Electrical Code. The enclosure may also afford benefits such as prevention from water and moisture, humidity, shock, dust, and other ambient conditions. Preferably the enclosure is designed to be comfortably worn on the body of a user such as on a belt which is worn around the waist torso or other suitable body part of the user. In this manner, the person could operate the computer in an environment, such as a petrochemical refinery, where ambient volatile gases and vapors are present, without fear of spark or explosion caused by the computer. When the user leaves the volatile environment and returns to a stabile one, such as his residence or his office, he can simply remove the core computer from the IS enclosure and insert it into a desktop, laptop, or other enclosure for access to any data collected or to perform any other computer operations.

In another related embodiment, the enclosure which mates with the core computer is designed to be resistant to the elements, including humidity, dust, heat, and cold. Thus the computer system created by the enclosure and the core computer will allow a person to operate it in environments which would otherwise be detrimental or corrosive to the electrical elements of a computer. When the person returns from the field, the core computer can be removed from the ruggedized IS enclosure and inserted into a desktop, laptop, or other enclosure for access of any data collected or to perform any other computer operations.

In yet another embodiment, the enclosure of the present invention may possess a wireless communication capability such that a user could be simultaneously or asynchronously transmitting data from his remote location. Optimally, only the antenna will protrude from the enclosure such that intrinsic safeness is not compromised by the wireless communication. Such communication can include wireless LAN (IEEE 802.11), cellular, Bluetooth, or other suitable wireless protocol.

In still an additional embodiment the enclosure may possess an integral touch screen LCD or like display. In this manner the enclosure serves as a complete computer system and interface when mated with the transferable core module. The user will insert the core and a power supply into receiving bays which are accessed by a latching hinged door. A power button will allow the system to power on and off and touch screen technology including a touch screen keyboard will be used to activate the computer system. The presence of the integral display screen will in no away affect the intrinsically safe and ruggedized properties of the enclosure.

In each embodiment, the common inventive feature is that the IS and ruggedized properties of the system created from the mating of the core computer and the enclosure are derived from the external case itself. As a result, standard COTS electrical components may be used in the construction of the internal circuitry decreasing the cost and market acceptability of the product.

DETAILED DESCRIPTION OF THE DISCLOSURE

Figure 1:
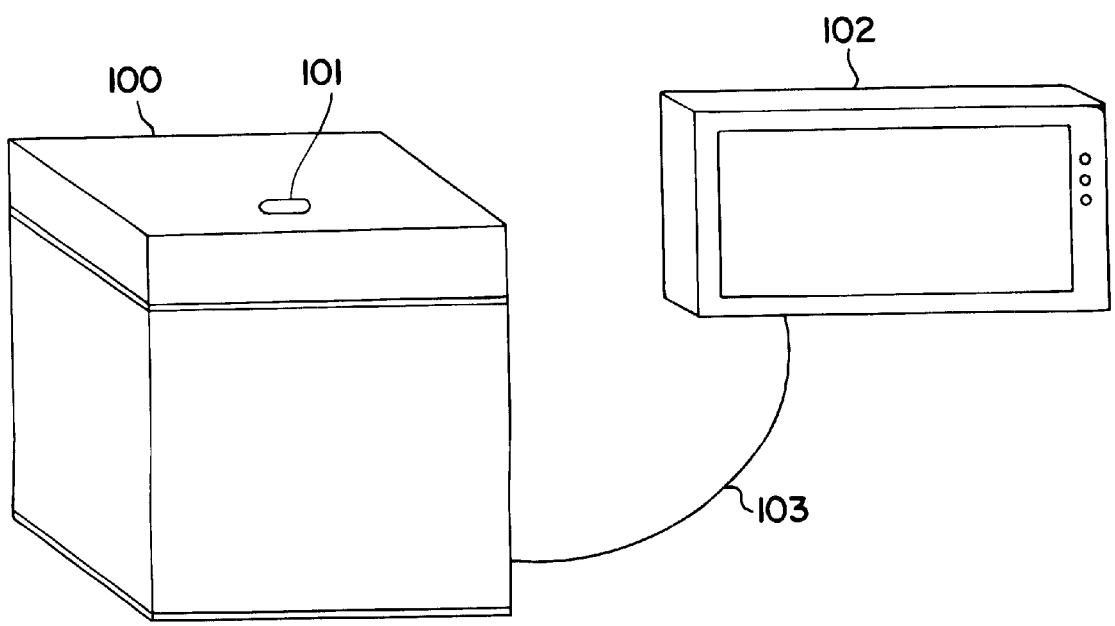
FIG. 1 illustrates a top view of the system of the present invention.
Figure 2:
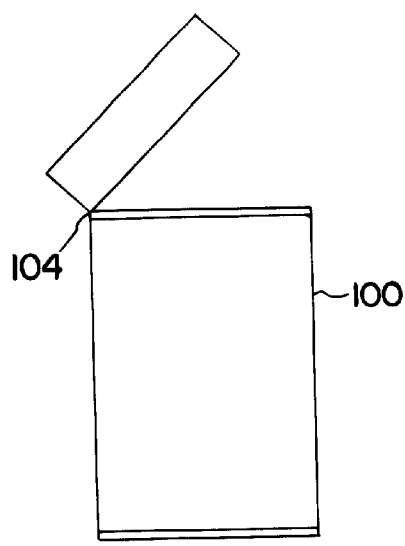
FIG. 2 illustrates a side view of the IS enclosure of the system of the present invention.

Discussion of the invention will now be made with specific reference to the drawing figures. FIG. 1 illustrates an exemplary embodiment of the present invention. The present invention includes an enclosure 100 with a latching lid which is released by latch release 101. The enclosure casing 100 is made of a light weight electrically insulating material such as plastic. The case 100 communicates with an external display 102 via hardwire connection 103. Alternatively, the connection between the case 100 and the display 102 is a wireless connection. The connection between the case 100 and the display 102 may be a permanent connection thus eliminating a contact point for a potential spark to be generated or alternatively the connection may be provided by an external safe connector. Connectors of this type are used in underwater communication line connections and are water and air tight. Utilized in the present invention such connectors would maintain the intrinsically safe properties of the enclosure casing 100. In this manner all electrical elements within the enclosure case 100 are shielded from the ambient environments such that the presence of ignitable gases and/or vapors will not pose a risk of explosion to a person utilizing the computer inside the enclosure case 100 in such an environment. FIG. 2 illustrates a side view of the enclosure casing 100 which shows the lid of the casing open and hinged about hinge point 104.

Figure 3:
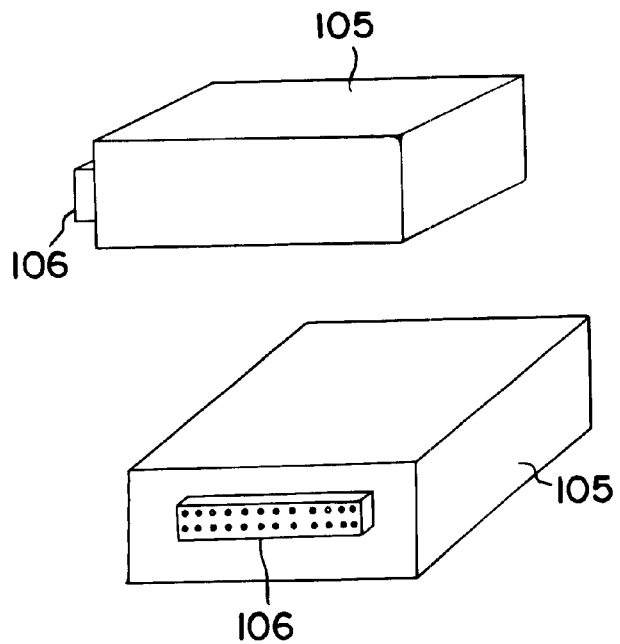
FIG. 3 illustrates a view of the transferable core module used in the system of the present invention.
Figure 4:
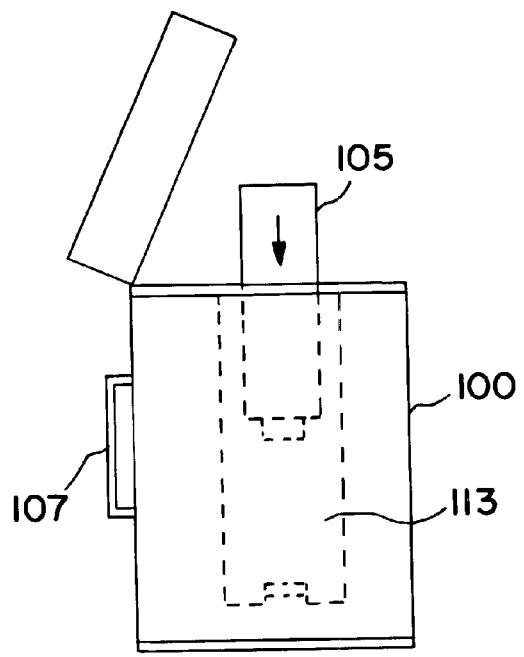
FIG. 4 illustrates a side view of the core module and the enclosure of the present invention.

FIG. 3 illustrates a transferable core computer module 105. The module 105 is an interfaceless box which contains some of the essential elements of a computer such as CPU, RAM, and hard drive. On one end of the module is the universal interface port 106 which provides power to the core module 105 and permits communication between the core module 105 and the remaining computer elements located within the enclosure casing 100. FIG. 4 illustrates the transferable core module being inserted into the enclosure 100. The enclosure 100 has a port 113 for receiving the core module 105. The core module 105 mates with the enclosure 100 via a universal connector port 106, which connects to a reciprocal connector in the enclosure 100. Optionally, proper alignment of the core and port 113 may be facilitated by guide rails on the port 113 or on the core module 105 or on both. A belt clip 107 may exist on the inside, closest to the user's body, face of the enclosure 100 so that the enclosure 100 may be secured by a belt about the user's waist when in use or being transported.

Figure 5:
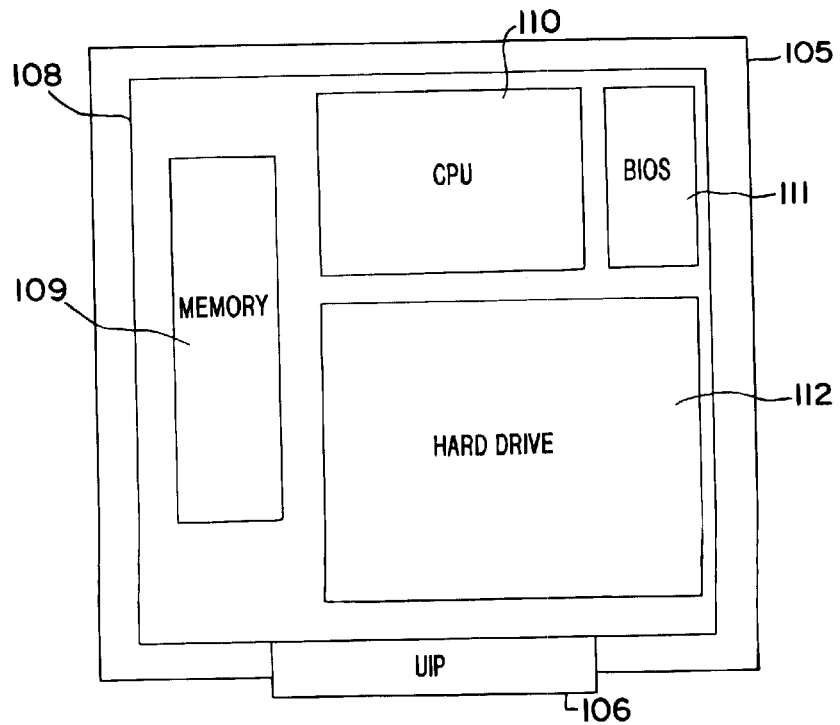
FIG. 5 illustrates an inner view of the internal components of the core computer and the enclosure of the present invention.
Figure 5:
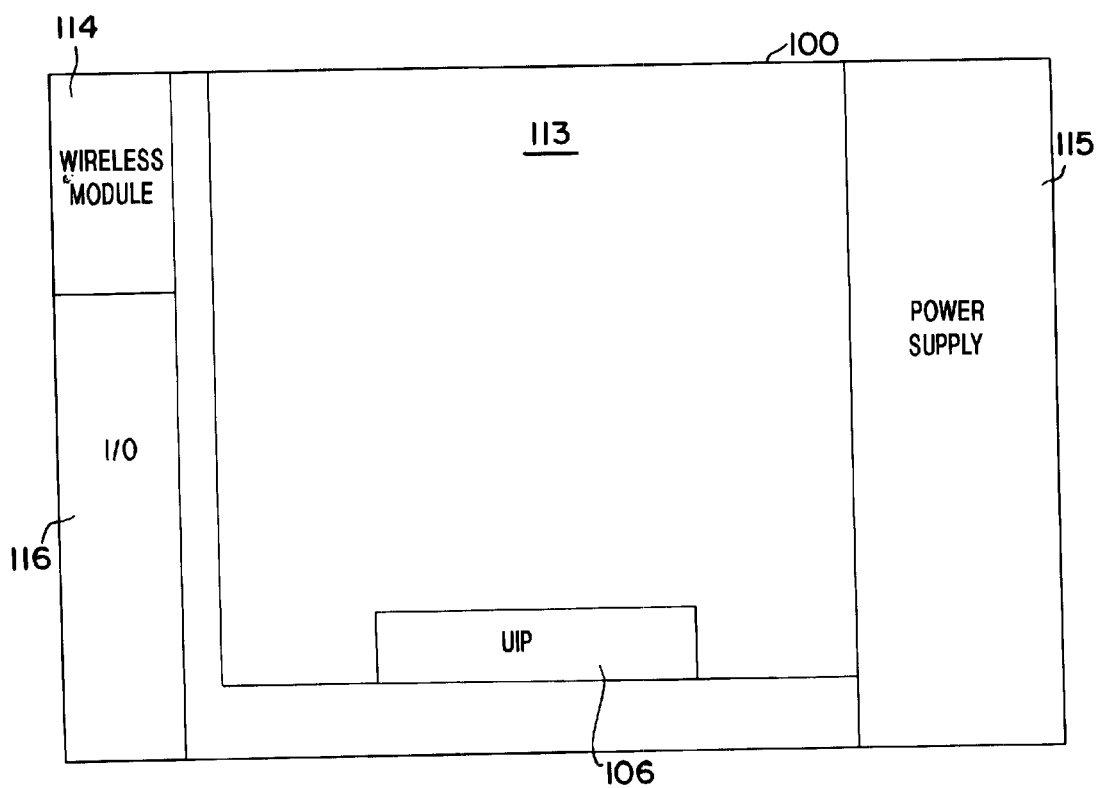

FIG. 5 illustrates an internal view of an exemplary core module 105 and enclosure 100 of the system of the present invention. The core module 105 contains a motherboard 108 comprised of a CPU 110, BIOS 111, hard drive 112, system memory 109 and a universal interface port 106. The port 106 supplies power to the core 105 and serves as the point of electrical interconnect between the enclosure 100 and the core 105. Then enclosure 100 contains a complimentary universal interface port 106 at the bottom of the receiving bay 113. Also inside the enclosure is a power supply 115, I/O 116 and optionally a wireless module 114 to permit wireless communication by the enclosure 100. Wireless communication can include wireless modem, wireless network, Bluetooth, or other wireless protocol. Alternatively, the power supply 115 may be external to the enclosure case 100 or a secondary power supply may interface with the enclosure. This secondary power supply may include an AC power source or a DC power source. Thus, when the core module 105 is inserted into the enclosure 100 and the lid is shut and locked, a fully functional computer is created which has the property of being ruggedized and intrinsically safe. External to the electrical components of the enclosure will be shock absorbing and insulating materials such as foam, silicone or rubber. The external case itself will be made of a lightweight, durable low-loss dielectric and any ports or external interfaces will be appropriately shielded so as to eliminate the chance of spark and the possibility of environmental contamination to the internal components.

Figure 6:
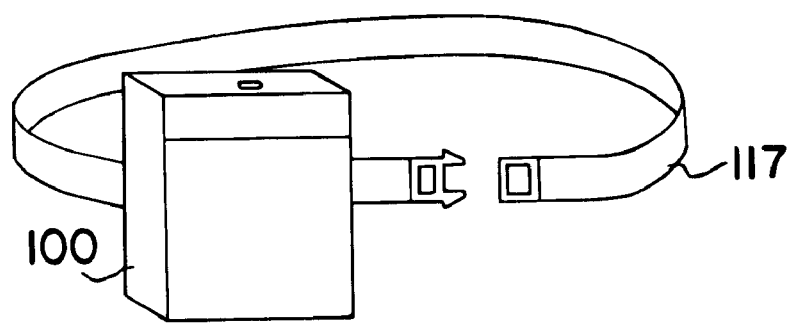
FIG. 6 illustrates a belt mounted embodiment of the present invention.
Figure 7:
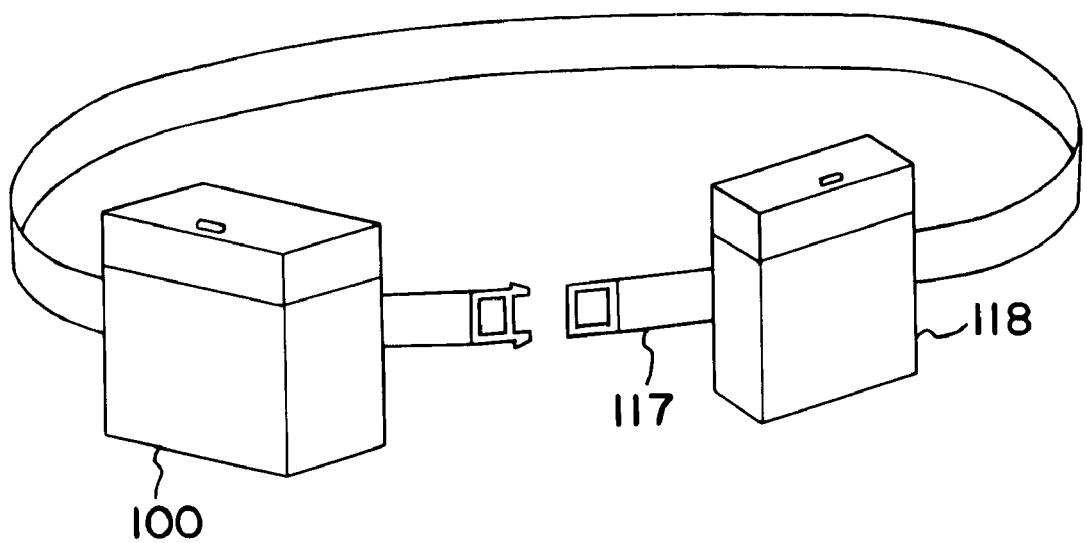
FIG. 7 illustrates an alternative belt mounted embodiment of the present invention.

FIG. 6 illustrates the enclosure 100 attached to a belt 117 which is worn around the waist, torso, or other suitable body part of the user. In this manner the weight of the system can be distributed on the hips of the user minimizing the burden to the user. The belt is preferably adjustable so that the it can accommodate persons of varying waist size. FIG. 7 illustrates a variation on the belt embodiment wherein an external power supply 118 is also secured on the belt 117 on the opposing side of the enclosure 100. A sealed cable will carry power from the power supply 118 to the enclosure 100, wherein the cable is concealed within the belt 117 or within a channel within the belt 117 and protected from electrical discharge and the ambient environment.

Figure 8A:
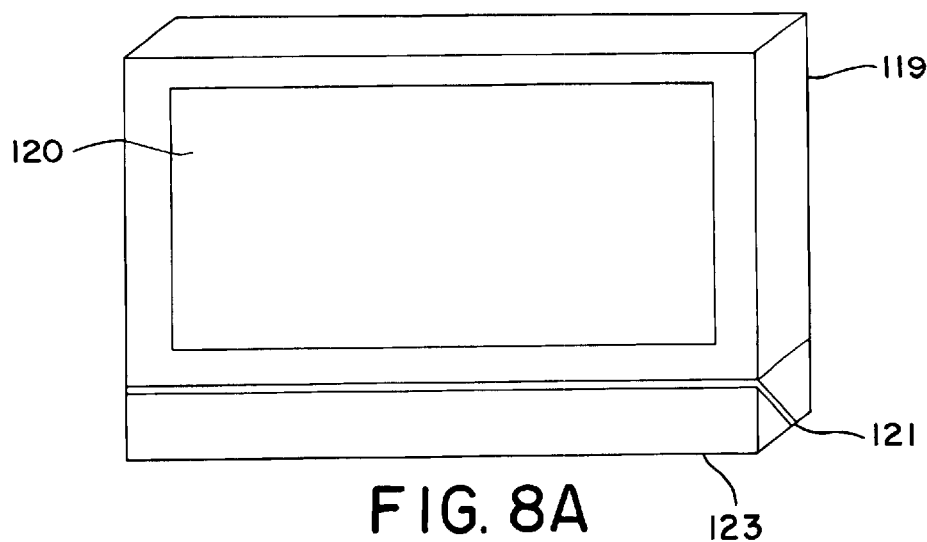
FIG. 8A illustrates a single enclosure embodiment of the present invention.
Figure 8B:
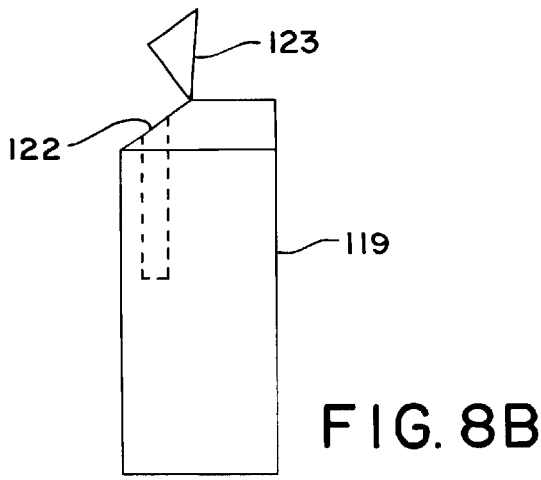
FIG. 8B illustrates a side view of the single enclosure embodiment of the present invention.
Figure 9:
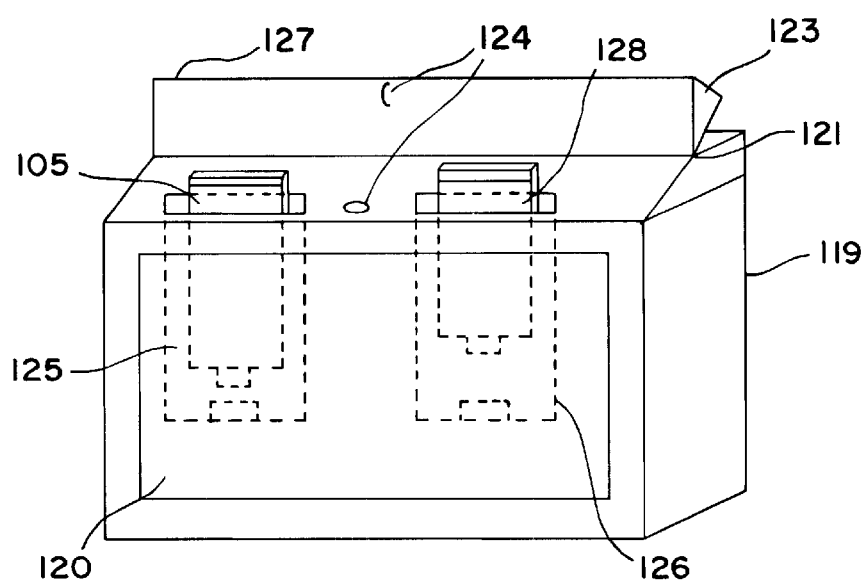
FIG. 9 illustrates a internal view of the single enclosure embodiment of the present invention.

In another embodiment of the present invention, the intrinsically safe enclosure is not only receives the transferable core module 105, but also has an integral touch screen display. See FIG. 8A. In FIG. 8A, the enclosure 119 has a display screen 120 on the front face. Preferably the display screen 120 is responsive to touch or stylus input and makes use of a soft keyboard eliminating the need for external activation devices. It has a hinge point 121 in the bottom so that a latching door 123 can open to reveal a compartment to receive the transferable core module 105. FIG. 8B illustrates the enclosure 119 with the door 123 open revealing an opening 122 for receiving the core module 105. FIG. 9 illustrates a front view of the enclosure 119 with the door 123 open. There are two bays, 125 and 126 for receiving the transferable core module 105 and the battery 128 respectively. Latching mechanism 124 secures the door 123 in place once it is closed. Sealing gasket 127 provides an air and watertight seal around the door once it is closed.

The preferred and optimally preferred embodiments of the present invention have been described herein to illustrate the underlying principles of the invention, but it is to be understood that numerous modifications, designs, and alterations may be made without departing from the spirit and scope of this invention

We claim:

1. A system for providing wearable computer access to remote workers, the system comprising:
   a transferable core computer module for providing processing means;
   an enclosure for enclosing and electrically interconnecting with said module, wherein said enclosure is designed to be Intrinsically safe according to Class 1 Division 1, Division 2, or mixtures thereof of the U.S. Electrical Code;
   a power supply means for providing electrical power for electrical components in said module and said enclosure;
   supporting means for supporting said enclosure on the body of a user of said system;
   sealing means for selectively sealing the enclosure when said module has been interconnected with said enclosure.

2. The system of claim 1 wherein said enclosure comprises communication means.

3. The system of claim 2 wherein said enclosure has connection means for external devices, wherein said connection means does not reduce the efficacy of the properties of the enclosure.

4. The system of claim 3 wherein said external devices comprise display devices, power supply devices, activation devices, sensor devices, transducer devices and communication devices.

5. The system of claim 1 wherein said enclosure has properties comprised of water tightness, non-corrosiveness, air tightness, shock resistance, and intrinsic safety.

6. The system of claim 1 wherein said communication means consists of wired communication means, wireless communication means, and mixtures thereof.

7. A computer system for use in environments containing ambient flammable, combustible and explosive materials, the system comprising:
   a transferable core computer module;
   an enclosure which, when mated with said core computer module provides becomes a functional computer system, wherein said enclosure is constructed in such a manner as to be considered intrinsically safe according to class 1, division 1, division 2 or mixtures thereof of the U.S. Electrical Code;
   a physical interconnection means for interconnecting said module and said enclosure;
   an electrical interconnection means for interconnecting said module and said enclosure;
   an access door on said enclosure for accessing at least one receiving bay;

a sealing means for sealing said door when it is closed;

a power means for supply power to electrical components in said enclosure and said a module;

a display screen integral to said enclosure, said display screen being responsive to touch or stylus input and said display screen capable of displaying a functional keyboard on said screen, said keyboard capable of affecting textual input.

8. The system of claim 7 wherein said enclosure comprises communication means.

9. The system of claim 7 wherein said enclosure has properties comprised of water tightness, non-corrosiveness, air tightness, shock resistance, and intrinsic safety.

10. The system of claim 7 wherein said enclosure has connection means for external devices, wherein said connection means does not reduce the efficacy of the properties of the enclosure.

11. The system of claim 10 wherein said external devices comprise display devices, power supply devices, activation devices, sensor devices, transducer devices and communication devices.

12. The system of claim 7 wherein said communication means consists of wired communication means, wireless communication means, and mixtures thereof.

13. The system of claim 7 wherein said display screen and enclosure have means to be activated both in a hands free and a manual manner.

14. The system of claim 7 wherein said system has both audio and visual means to power down and control said system.

15. The system of claim 7 wherein said enclosure has ports for connection of peripheral devices thereto.

16. A method for providing wearable computer access to remote workers, the method comprising the steps of:

providing a transferable core computer module;

providing an enclosure for enclosing and electrically interconnecting with said module, wherein said enclosure is enabled to provide an intrinsically safe computer according to Class 1 Division 1, Division 2, or mixtures thereof of this U.S. Electrical Code;

providing electrical power for electrical components in said module and said enclosure;

providing means for supporting said enclosure on the body of a user of said system.

17. A method for providing computing capabilities in environments containing ambient flammable, combustible and explosive materials, the method comprising the steps of:

providing a transferable computer module and an enclosure which when mated becomes a functional computer system, wherein said enclosure is enabled to provide an intrinsically safe computer according to Class 1 Division 1, Division 2, or mixtures thereof of this U.S. Electrical Code;

providing electrical power for electrical components in said module and said enclosure; to touch or stylus input and said display screen enabled to display functional keyboard on said screen, said keyboard enabled to receive textual input.

* * * * *